United States Patent
Weigl et al.

(10) Patent No.: US 6,582,824 B1
(45) Date of Patent: Jun. 24, 2003

(54) SEALANT COMPOSITION, ARTICLE AND METHOD

(75) Inventors: Stefan Weigl, Neuss (DE); Gertrud A. Klein, Kaarst (DE); Shuichi Kitano, Sagamihara (JP); Kotaro Shinozaki, Yokohama (JP); Tomohiro Koiwa, Sagamihara (JP); Kazuyoshi Shiozaki, Sagamihara (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/806,421

(22) PCT Filed: Oct. 2, 1998

(86) PCT No.: PCT/EP98/06323

§ 371 (c)(1),
(2), (4) Date: Mar. 30, 2001

(87) PCT Pub. No.: WO00/20526

PCT Pub. Date: Apr. 13, 2000

(51) Int. Cl.$^7$ ................................................ B32B 27/38
(52) U.S. Cl. .................... 428/413; 428/423.1; 525/454; 525/903; 525/453; 525/457; 525/458
(58) Field of Search .............................. 428/413, 423.1; 525/454, 453, 903, 920, 528

(56) References Cited

U.S. PATENT DOCUMENTS

| 3,158,586 A | 11/1964 | Krause |
| 3,525,779 A | 8/1970 | Hawkins et al. |
| 4,036,906 A | 7/1977 | Finelli |

(List continued on next page.)

FOREIGN PATENT DOCUMENTS

| EP | 0 153 135 | 8/1985 |
| EP | 0 159 448 | 10/1985 |
| EP | 0 210 859 | 2/1987 |
| EP | 0 417 357 | 3/1991 |
| JP | 58210920 | 12/1983 |
| JP | 5059347 | 3/1993 |
| JP | 6329980 | 11/1994 |
| JP | 7238265 | 9/1995 |
| JP | 2646603 | 8/1997 |
| JP | 2649636 | 9/1997 |
| WO | WO 95/26994 | 10/1995 |
| WO | WO 96/32453 | 10/1996 |

OTHER PUBLICATIONS

Cassidy et al., "Two–Component Interpenetrating Polymer Networks (IPN's) From Polyurethane and Epoxies. I. Studies on Full IPN, Pseudo–IPN, and Graft Polymer Alloys of Polyurethanes and Epoxies", *Journal of Polymer Science: Polymer Chemistry Edition*, vol. 22, pp. 1839–1850, 1984.

Cassidy et al., "Two–Component Interpenetrating Polymer Networks (IPN's) From Polyurethane and Epoxies. II. Effect of Different Charge Groups in Polyurethanes and Epoxies on Properties and Morphologies of Two–Component IPNs", *Journal of Polymer Science: Polymer Chemistry Edition*, vol. 22, pp. 1851–1863, 1984.

Chern et al., "Interpenetrating Polymer Networks of Polyurethane and Epoxy", *Journal of Materials Science*, 29, pp. 5435–5440, 1994.

Frisch et al., "Urethane–Based Polymer Alloys (IPNs)", *Journal of Elastomers and Plastics*, vol. 17, pp. 24–43, Jan. 1985.

(List continued on next page.)

*Primary Examiner*—Robert Dawson
*Assistant Examiner*—Christopher M Keehan
(74) *Attorney, Agent, or Firm*—Douglas B. Little

(57) ABSTRACT

A composition comprises a curable epoxy-containing material, a first thermoplastic polyurethane component, a curative for the epoxy-containing material, and optionally, a second thermoplastic polyurethane component that is different than the first thermoplastic polyurethane component. The compositions are useful for sealing discontinuities in a substrate surface, especially those found in motor vehicles. Sealant articles and methods of sealing discontinuities are also disclosed.

17 Claims, 1 Drawing Sheet

U.S. PATENT DOCUMENTS

| | | | |
|---|---|---|---|
| 4,423,185 A | | 12/1983 | Matsumoto et al. |
| 4,521,490 A | | 6/1985 | Pocius et al. |
| 4,560,579 A | | 12/1985 | Siadat et al. |
| 4,608,418 A | * | 8/1986 | Czerwinski et al. ........ 524/296 |
| 4,690,964 A | | 9/1987 | Schmidt et al. |
| 4,870,142 A | | 9/1989 | Czerwinski et al. |
| 4,923,934 A | | 5/1990 | Werner |
| 5,061,776 A | | 10/1991 | Weaver et al. |
| 5,223,106 A | | 6/1993 | Gerace et al. |
| 5,232,996 A | | 8/1993 | Shah et al. |
| 5,331,062 A | | 7/1994 | Sorathia et al. |
| 5,407,978 A | | 4/1995 | Bymark et al. |
| 5,449,737 A | * | 9/1995 | Uchida et al. ................ 528/73 |
| 5,580,946 A | | 12/1996 | Mann |
| 5,621,043 A | | 4/1997 | Croft |
| 5,674,565 A | | 10/1997 | Kausch et al. |
| 6,054,007 A | * | 4/2000 | Boyd et al. ................. 156/245 |
| 6,132,835 A | * | 10/2000 | Scholz et al. ................ 428/68 |

OTHER PUBLICATIONS

Hsieh et al., "Graft Interpenetrating Polymer Networks of Polyurethane and Epoxy. I. Mechanical Behavior", *Journal of Polymer Science: Part B: Polymer Physics*, vol. 28, pp. 623–630, 1990.

Hsieh et al., "Graft Interpenetrating Polymer Networks of Polyurethane and Epoxy. II. Toughening Mechanism", *Journal of Polymer Science: Part B: Polymer Physics*, vol. 28, pp. 783–794, 1990.

Hsei et al., "Glass–Fiber Composites from Polyurethane and Epoxy Interpenetrating Polymer Networks", *American Chemical Society*, No. 239, pp. 426–446, 1994.

Hsieh et al., "Interpenetrating polymer networks of polyurethanes and epoxy resin, I", *Die Angewandte Makromolekulare Chemie*, 193, pp. 89–98, 1991.

Hsieh et al., "Interpenetrating polymer networks of polyurethanes and epoxy resin, II", *Die Angewandte Makromolekulare Chemie*, 194, pp. 15–22, 1992.

Klempner et al., "Energy Absorbing Two– and Three–Component Interpenetrating Polymer Networks", *Advances in Interpenetrating Polymer Networks*, vol. II, pp. 1–47, 1990.

Li et al., "Study on the Properties and Application of Epoxy Resin/Polyurethane Semi–interpenetrating Polymer Networks", *Journal of Applied Polymer Science*, vol. 61, pp. 2059–2063, 1996.

Li et al., "A Study on the Glass Transition Behavior and Morphology of Semi–Interpenetrating Polymer Networks", *Journal of Polymer Science: Part A: Polymer Chemistry*, vol. 34, pp. 2371–2375, 1996.

\* cited by examiner

SEALANT COMPOSITION, ARTICLE AND METHOD

This application is a National Stage filing of an international application under 35 USC 371 of PCT patent application Ser. No. PCT/EP98/06323, filed Oct. 2, 1998, which was published under PCT Article 21(2) in English.

BACKGROUND OF THE INVENTION

1. Field of the Invention

This invention relates to compositions for sealing discontinuities, for example of the type found in motor vehicles, and to articles used in sealing the discontinuities, as well as to methods of sealing the discontinuities.

2. Description of the Related Art

Motor vehicles such as automobiles and trucks have metal joints and seams that must be sealed. One example is a generally non-planar overlap joint formed by welding together the roof and the side panel of the vehicle to create a square U-shaped trough called a roof ditch. Water collects in the roof ditch and then is drained away from the vehicle.

To prevent water from seeping through the joint it is necessary to seal it. It is often difficult to obtain a good seal, however, because the joint is not planar. In addition, the width of the roof ditch typically varies along its length, further complicating the ability to provide a good seal. Historically, a variety of materials have been used as sealants to fill voids in motor vehicles and exclude dirt, moisture, and other undesirable materials.

Sealants have been supplied as liquid or solid materials depending upon the demands of the application. In the automotive industry, for instance, roof ditch joints are typically sealed using a paste-like plastisol which is then painted, baked and cooled to room temperature.

Hot melt sealants are also used and are generally solid thermoplastic materials which quickly melt with heating and then form a firm bond on cooling. In use, a bead of molten liquid sealant is applied on the joint or seam, much in the way caulking is applied. A worker then brushes or levels the material into a layer of relatively uniform thickness. Applying such a sealant takes skill and often results in a poorly sealed joint or seam. Hot melt sealants cannot be used for visible applications due to non-uniform appearance. A typical hot melt sealant composition utilizes polyolefins that can be difficult to paint and which have poor adhesion to non-porous metallic surfaces, such as steel and aluminum.

Recently there has been a trend towards more "user-friendly" polyvinyl chloride-based sealants that are provided in the form of a rope or a tape because the handling properties of these materials permit faster installation and eliminate the need to finesse the material after application. Other materials have also been supplied as a strip or a tape.

Once the sealant has been applied, its exposed surface may be covered with a plastic or rubber molding having a flexible top surface, which molding may be painted, for example to match or complement the color of the vehicle exterior. Alternatively, a metal molding may be used. The molding is typically attached to the sealant surface using a mechanical fastener or a pressure sensitive adhesive.

During its life the motor vehicle may be exposed to very cold temperatures of −20° C. or lower, for example, −30 to −40° C., especially if the vehicle is destined for use in extreme northern climates. Under such conditions, sealants, particularly those that may be used in roof ditch applications, should desirably maintain much of the flexibility that they demonstrate under more ordinary temperatures. This will help prevent the sealant from cracking, breaking, delaminating or lifting up from the surface to which it has been applied as a result of stresses caused by ordinary vehicle use. This not only permits the intrusion of dirt, moisture, and other undesirable materials but can cause a subsequently applied molding to become loose.

SUMMARY OF THE INVENTION

In general, this invention relates to compositions for sealing discontinuities and to articles used in sealing the discontinuities, as well as to methods of sealing the discontinuities. The sealant compositions of the invention are especially useful for sealing the types of discontinuities typically found in motor vehicles such as an overlap seam or joint, a butt seam or joint, a depression or indentation, a hole, a spot weld, or a manufacturing defect. The seals are effective in preventing water, dirt, snow, and other undesirable materials from entering the discontinuity and causing corrosion. Quite advantageously, sealant compositions according to the invention have excellent flexibility, even after conditioning at a temperature of −20° C.

Accordingly, and in one embodiment, the invention is directed to a composition comprising a curable epoxy-containing material, a first thermoplastic polyurethane component, a curative for the epoxy-containing material, and, optionally, a second thermoplastic polyurethane component that is different than the first thermoplastic polyurethane component. The epoxy-containing material and thermoplastic polyurethane component(s) when melt-blended, but still uncured, display only a single phase. After curing the sealant composition is phase-separated. In addition, the composition passes the test for "Low Temperature Flexibility" that is described more fully hereinbelow.

The thermoplastic polyurethane component is preferably based on a polyether polyol, more preferably, a polytetramethylene oxide polyol. Thus, in another embodiment, the invention relates to a composition that comprises a curable epoxy-containing material, a first thermoplastic polyurethane component that is the polymerization product of a polymerizable mixture comprising a polyisocyanate and a polytetramethylene oxide polyol, a curative for the epoxy-containing material, and optionally, a second thermoplastic polyurethane component that is different than the first thermoplastic polyurethane component. Such compositions provide a melt-flowable sealant for sealing discontinuities in the surface of a substrate, such as those found in motor vehicles.

In certain embodiments the polytetramethylene oxide polyol preferably has a number average molecular weight of at least 600, especially when used in combination with an aliphatic polyisocyanate. In other embodiments, the polytetramethylene oxide polyol preferably has a number average molecular weight of at least 1000, especially when used in combination with an aromatic polyisocyanate. Diisocyanates are preferred for use as the polyisocyanate. Thus, the polymerizable mixture for first thermoplastic polyurethane component preferably comprises either an aliphatic diisocyanate, a polytetramethylene oxide polyol that has a number average molecular weight of at least 600, and a diol chain extending agent, or an aromatic diisocyanate, a polytetramethylene oxide polyol that has a number average molecular weight of at least 1000, and a diol chain extending agent.

The compositions of the invention are preferably tacky at a temperature of about 15 to 25° C. In addition, it is preferred that they display at least one glass transition temperature of less than −20° C., more preferably, less than −30° C., even more preferably less than 40° C., and most preferably −40 to −50° C. The compositions of the invention further and preferably have a Shore D hardness of less than 50 or a Shore A hardness of less than 85.

The compositions of the invention generally include about 20 to 70 weight percent (wt. %) of the epoxy-containing material, and about 30 to 80 wt. % of any thermoplastic polyurethane component present in the composition, wherein the sum of these materials is 100 wt. %. Preferably, however, the sealant compositions include about 20 to 40 wt. % of the epoxy-containing material, and about 60 to 80 wt. % of any thermoplastic polyurethane component present in the composition. More preferably, the sealant compositions comprise about 20 to 38 wt. % epoxy-containing material, and 62 to 80 wt. % thermoplastic polyurethane component. Even more preferably, the sealant compositions comprise about 25 to 35 wt. % epoxy-containing material, and 65 to 75 wt. % thermoplastic polyurethane component. Most preferably, the sealant compositions comprise about 30 to 33 wt. % epoxy-containing material, and 67 to 70 wt. % thermoplastic polyurethane component.

The sealant compositions may further comprise a second thermoplastic polyurethane component, which preferably is the polymerization product of a polymerizable mixture comprising a polyisocyanate and a polyester polyol. Other materials typically found in the sealant compositions include a thermally activated curative, for example, dicyandiamide, and an accelerator such as an imidazole. The sealant compositions may also include a hydroxyl- or carboxyl-terminated polyester compound. Preferably such materials are semi-crystalline at room temperature with a softening point of less than about 140° C., and a number average molecular weight of about 7,500 to 200,000.

Various sealant articles may also be readily provided by combining a layer of a sealant composition according to the invention with another layer that is attached thereto such as a dimensionally stable thermoplastic film or a B-staged, thermosetting plastic cap, though other layers may be used too.

The invention also relates to a method of sealing a discontinuity in the surface of a substrate. This method comprises the steps of:

a) placing over the discontinuity, a sealant composition according to the invention, b) heating the sealant composition to cause the composition to flow and seal the discontinuity; and c) allowing the sealant composition to cool.

BRIEF DESCRIPTION OF THE DRAWINGS

The invention will be more fully appreciated with reference to the following drawings in which.

DETAILED DESCRIPTION OF THE PREFERRED EMBODIMENTS

Figure 1:
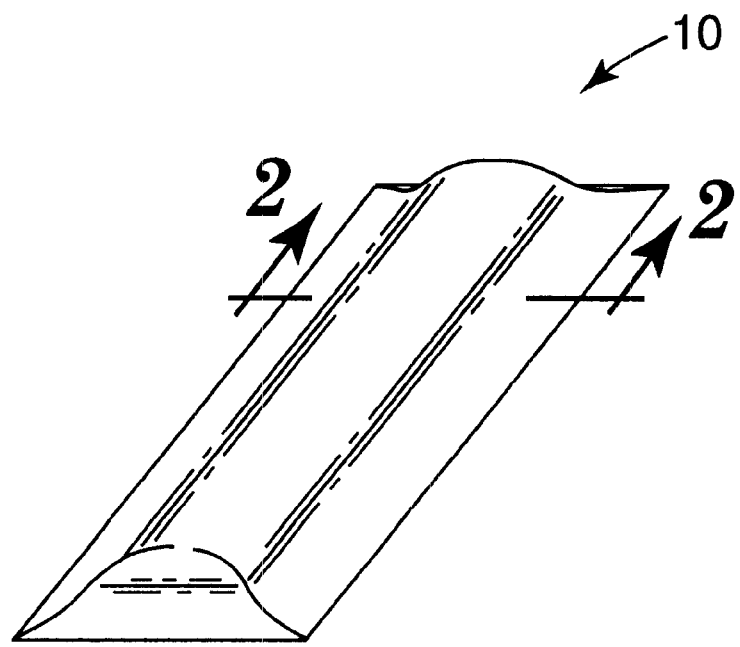
FIG. 1 is a perspective view of one embodiment of a sealant article according to the invention.

The invention pertains to a composition that can be used to form a protective seal over a discontinuity such as an overlap seam or joint, a butt seam or joint, a depression or indentation, a hole, a spot weld, or a manufacturing defect so as to prevent, water, dirt, snow, and other undesirable materials from entering the discontinuity and causing corrosion. The sealant composition is preferably solid at room temperature. A slight amount of tackiness at or slightly below room temperature is desirable for helping to initially position the sealant (or an article containing the sealant) over a joint or a seam, such as da motor vehicle roof ditch. However, sealant compositions that are substantially tack-free at room temperature are also contemplated.

The sealant compositions may be regarded as melt-flowable. That is, when placed over the joint and heated, the sealant composition first softens and conforms to the surface of the discontinuity, thereby pushing out trapped air. Further into the heating cycle, as the composition becomes hotter, it becomes tacky, and bonds to the surface. The sealant composition is thermosetting such that it cures (i.e., covalently crosslinks) upon heating and resists flowing following cooling and re-heating.

The sealant compositions of the invention, once cured, exhibit excellent flexibility at low temperatures and, as described more fully hereinbelow, can be easily bent about a mandrel without cracking or breaking, even after conditioning at a temperature of −30° C. It is also preferred that the cured sealant composition possess at least 10% elongation when tested at −20° C.

The sealant compositions of the invention comprise, and more preferably consist essentially of, an epoxy-containing material, a thermoplastic polyurethane component, and a curative for the epoxy-containing material. The epoxy-containing material contributes to the ultimate strength and heat resistance of the sealant composition, while the thermoplastic polyurethane component provides conformability, pliability and flexibility, especially at low temperatures. The curative permits the composition to cure. Preferably, the curative is thermally-activated such that the composition cures upon exposure to an appropriate heat source for an appropriate period of time.

Useful epoxy-containing materials are epoxy resins that have at least one oxirane ring polymerizable by a ring opening reaction. Such materials, broadly called epoxides, include both monomeric and polymeric epoxides and can be aliphatic, cycloaliphatic, or aromatic. These materials generally have, on the average, at least two epoxy groups per molecule preferably more than two epoxy groups per molecule. Such materials may be referred to as polyepoxides and include epoxy-containing materials in which the epoxy functionality is slightly less than 2, for example, 1.8. The "average" number of epoxy groups per molecule is defined as the number of epoxy groups in the epoxy-containing material divided by the total number of epoxy molecules present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyl) adipate. For a more detailed list of useful epoxides of this nature, reference may be made to U.S. Pat. No. 3,117,099.

Further epoxy-containing materials which are particularly useful are glycidyl ether monomers such as glycidyl ethers of polyhydric phenols obtained by reacting a polyhydric phenol with an excess of chlorohydrin such as epichlorohydrin (e.g., the diglycidyl ether of 2,2-bis-(2,3-epoxypropoxyphenol) propane). Further examples of epoxides of this type which can be used in the practice of this invention are described in U.S. Pat. No. 3,018,262. Other useful glycidyl ether based epoxy-containing materials are described in U.S. Pat. No. 5,407,978.

There are a number of commercially available epoxy-containing materials which can be used. In particular, epoxides which are readily available include octadecylene oxide, epichlorohydrin, styrene oxide, vinylcyclohexene oxide, glycidol, glycidyl methacrylate, diglycidyl ether of Bisphenol A (e.g., those available under the trade designations EPIKOTE 828, EPIKOTE 1004, and EPIKOTE 1001F from Shell Chemical Co., and DER-332 and DER-334, from Dow Chemical Co.), diglycidyl ether of Bisphenol F (e.g., ARALDITE GY281 from Ciba-Geigy Corp.), vinylcyclohexene dioxide (e.g., ERL 4206 from Union Carbide Corp.), 3,4-epoxycyclohexylmethyl-3,4-epoxycyclohexenecarboxylate (e.g., ERL-4221 from Union Carbide Corp.), 2-(3,4-epoxycylohexyl-5,5-spiro-3,4-epoxy) cyclohexane-metadioxane (e.g., ERL-4234 from Union Carbide Corp.), bis(3,4-epoxycyclohexyl)adipate (e.g., ERL-4299 from Union Carbide Corp.), dipentene dioxide (e.g., ERL-4269 from Union Carbide Corp.), epoxidized polybutadiene (e.g., OXIRON 2001 from FMC Corp.), epoxy silanes (e.g., beta-(3,4-epoxycyclohexyl) ethyltrimethoxysilane and gamma-glycidoxypropyltrimethoxy-silane, commercially available from Union Carbide), flame retardant epoxy resins (e.g., DER-542, a brominated bisphenol type epoxy resin available from Dow Chemical Co.), 1,4-butanediol diglycidyl ether (e.g., ARALDITE RD-2 from Ciba-Geigy Corp.), hydrogenated bisphenol A-epichlorohydrin based epoxy resins (e.g., EPONEX 1510 from Shell Chemical Co.), and polyglycidyl ether of phenolformaldehyde novolac (e.g., DEN-431 and DEN-438 from Dow Chemical Co.). Blends of different epoxies may also be used.

Preferred epoxy-containing materials may also be selected based on their reactivity and viscosity. As the reactivity of the epoxy-containing material increases, the resulting sealant composition will flow less upon heating, which could result in poor wetting of the substrate surface surrounding the discontinuity and/or incomplete sealing of the discontinuity. As the reactivity of the epoxy-containing material decreases, however, the sealant composition may flow too much upon heating and/or may not completely cure. The viscosity of the epoxy-containing material can also influence the melt flow properties of the sealant composition. In general, a low viscosity epoxy resin is desired as it can be more easily processed at lower temperatures which helps to avoid premature activation of any thermally-activated curative that may be included in the sealant composition. In turn, this can extend the storage life of the composition.

The compositions of the invention also include a thermoplastic polyurethane component. A thermoplastic polyurethane component refers to a polymeric material containing urethane moieties,

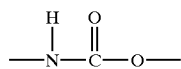

which material possesses thermoplastic processing characteristics. That is, the material softens and flows upon heating so that it can be shaped, and then hardened upon cooling. Upon reheating, the material becomes soft again. The thermoplastic polyurethane component is selected so as to achieve the desired miscibility with the epoxy-containing material (as well as other sealant composition ingredients that do not promote curing of the epoxy-containing material). The thermoplastic polyurethane component also contributes to the excellent low temperature properties of the sealant composition.

Desired thermoplastic polyurethane components form a homogeneous, single phase mixture when blended in the melt phase with the epoxy-containing material (i.e, melt-blended) but without curing the epoxy-containing materials. The formation of a homogeneous, single phase mixture is evidenced by the mixture being clear when melt-blended Upon curing of the epoxy-containing material, however, a multi-phase or phase-separated composition results, one phase being attributable to the cured epoxy-containing material and another phase resulting from the thermoplastic polyurethane component. The presence of a phase-separated composition can be shown by the presence of multiple Tan δ (delta) peaks in a dynamic mechanical thermal analysis (DMTA) of the cured composition, as described more fully below.

Preferred thermoplastic polyurethane components for use in the invention have at least one glass transition temperature (Tg) of less than −20° C., more preferably less than −30° C., even more preferably less than 40° C., and most preferably in the range of −50 to −40° C. As a result, the sealant compositions of the invention, once cured, display glass transition temperatures in the same ranges. The glass transition temperature for the thermoplastic polyurethane component or the cured sealant composition can be measured as the temperature at which the Tan δ peak attributable to the thermoplastic polyurethane component occurs in a DMTA assessment, which peak should have an amplitude of at least 0.05 unit.

Preferred thermoplastic polyurethane components for use in the invention also have a hardness value of less than 50 when measured on the Shore D scale or less than 85 when measured on the Shore A scale using the test method described in ISO 868: 1985, Plastic and ebonite determination of indentation hardness by means of a durometer (Shore hardness). Selecting thermoplastic polyurethane components having hardness values in these ranges also provides sealant compositions that are easier to mix at lower temperatures.

With these considerations in mind, thermoplastic polyurethane components useful in the invention are obtained as the polymerization product of a polymerizable mixture comprising a polyisocyanate and a polyether polyol. Preferably the resulting thermoplastic polyurethane component is substantially linear in nature.

The term polyisocyanate also includes isocyanate-terminated prepolymers. The polyisocyanates used to form the thermoplastic polyurethane component may be linear or branched, aliphatic, cycloaliphatic, araliphatic, heterocyclic or aromatic, or any combination of such polyisocyanates. Aliphatic polyisocyanates are preferred when a sealant composition that is tacky at room temperature is desired or if it is important to provide a thermoplastic polyurethane component that has a lower viscosity or that can be melt processed at lower temperatures (e.g., less than 90° C.) so as to avoid premature activation of any thermally-activated curative.

Particularly suitable polyisocyanates correspond to the formula Q(NCO)$_n$, wherein n is an integer of from about 2 to about 4, most preferably about 2 so as to yield diisocyanates. An isocyanate functionality of 2.2 or less, more preferably 2.15 or less, and most preferably in the range of 2.0 to 2.1 promotes the formation of a thermoplastic polyurethane component, as opposed to a polyurethane material that would be considered thermosetting. Q is selected from aliphatic hydrocarbon radicals containing from about 2 to about 100 carbon atoms. Q may include cycloaliphatic hydrocarbon radicals, aromatic hydrocarbon radicals or heterocyclic aromatic radicals and araliphatic hydrocarbon radicals. Portions of Q may contain heteroatoms including oxygen, nitrogen, sulfur and halogens.

Examples of polyisocyanates that may be used include ethylene diisocyanate, 1,4-tetramethylene diisocyanate, 1,6-hexamethylene diisocyanate, trimethylhexamethylene diisocyanate, 1,12-dodecane diisocyanate, cyclobutane-1,3-diisocyanate, cyclohexane-1,3 and 1,4-diisocyanate, 1-isocyanato-3,3,5-trimethyl-5-isocyanatomethyl cyclohexane, 2,4- and 2,6-hexahydrotolylene diisocyanate, hexahydro-1,3 and -1,4-phenylene diisocyanate, hexahydro-2,4'- and 4,4'-diphenylmethane diisocyanate, 1,3-and 1,4-phenylene diisocyanate, 2,4- and 2,6-tolylene diisocyanate, diphenylmethane2,4'- and 4,4'-diisocyanate, and naphthylene-1,5-diisocyanate. Mixtures of different isocyanates may also be used.

Preferred polyisocyanates include hexamethylene diisocyanate, the isocyanurate and the biuret thereof, 1-isocyanato-3,3,5-trimethyl-5-isocyanatomethyl cyclohexane (isophorone diisocyanate), the tolylene diisocyanates and isocyanurates thereof, the mixed isocyanurate of tolylene diisocyanate and hexamethylene diisocyanate, 4,4'-methylene-bis(cyclohexyl diisocyanate), and the diphenylmethane diisocyanates.

Polyether polyols useful in the practice of the invention are typically substantially linear compounds corresponding to the general structural formula HO—D—OH and having a hydroxyl functionality of about 2.2 or less, preferably about 2.0, wherein D represents the organic residue of a polyether linkage. A thermoplastic polyurethane component of desired characteristics may be obtained by employing polyether polyols having a number average molecular weight of at least 600 in the case of an aliphatic thermoplastic polyurethane component, or at least 1000 in the case of an aromatic thermoplastic polyurethane component. Most preferred are polyether polyols, which in addition to displaying the properties described above, are polytetramethlyene oxide polyols, which can be obtained from a cationic ring-opening polymerization of tetrahydrofuran. Examples of commercially useful polytetramethylene oxide polyols include the POLYMEG series from QO Chemicals, Inc. (e.g., POLYMEG 650, 1000 and 2000), the TERATHANE series from E.I. duPont de Nemours and Company (e.g., TERATHANE 650, 1000 and 2000), POLYTHF from BASF Corp., and combinations or mixtures thereof The polymerization mixture from which the thermoplastic polyurethane component is obtained may also include a chain extending agent to produce a thermoplastic polyurethane component of higher molecular weight. Chain extending agents, compounds which carry at least two active hydrogen atoms per molecule, preferably have a molecular weight of from about 52 to below 500, most preferably from about 62 to about 250. Examples of useful chain extending agents are the following: ethylene glycol, propane-1,2-diol, butane-1,4-diol; hexane-1,6-diol; 2-ethyl-1,6-hexanediol; dihydroxyethylurea; terephthalic acid-bis(β-hydroxyethylamide); hydroquinone-bis-hydroxy-ethyl ether; naphthylene-1,5-bis-hydroxyethyl ether; 1,1-dimethyl-4-(bis-β-hydroxyethyl)-semicarbazide; succinic acid;-adipic acid; isophthalic acid; 1,4-cyclohexanedicarboxylic acid, ethylenediamine; hexamethylenediamine; 1,4-cyclohexanediamine; hexahydro-m-xylene diamine; m-xylylene diamine; p-xylylene diamine; bis(β-aminoethyl)-oxalamide; piperazine; 2, -dimethylpiperazine; ethanolamine; 6-aminocaproic acid; 4,4-diaminodiphenylmethane; 4,4'-diaminodiphenyl-dimethylmethane, 2-aminoacetic acid hydrazide; 4-aminobutyric acid hydrazide; 6-aminocaproic acid hydrazide; 2-hydroxy-acetic acid hydrazide; 2-aminobutyric acid hydrazide; 6-hydroxycaproic acid hydrazide; carbodihydrazide; hydracrylic acid dihydrazide; adipic acid dihydrazide; isophthalic acid dihydrazide;, m-xylylene dicarboxylic acid dihydrazide; ethylene glycol-bis-cabazinic ester; butanediol-bis-semicarbazide and hyexamethylene-bis-semicarbazide.

The use of diamine chain extenders results in the formation of polyurethane/urea materials. At low levels of such chain extenders, the formation of polyurethane segments predominates and the resulting materials may still be regarded as a thermoplastic polyurethane component for use in the invention.

The polymerization mixture for the thermoplastic polyurethane component typically has an isocyanate (NCO) index of about 0.95 to 1.05, more preferably about 1.0 so as to promote the formation of a thermoplastic material rather than a thermosetting polyurethane. The isocyanate index refers to the molar ratio of isocyanate groups to hydroxyl groups in the polymerizable mixture.

A variety of thermoplastic polyurethane components are commercially available and may be used in the practice of the invention, including, for example, TEXIN DP7-3005 from Bayer Corporation, DESMOPAN KU2-8600 from Bayer Corporation, and the MORTHANE PE series from Morton Chemical Company (e.g., 192-100, 193-100 and 299-100).

The sealant compositions of the invention include a curative for curing the epoxy-containing material. Preferably, the curative is thermally activated so as to effect curing or hardening of the epoxy-containing material under the influence of heat. For example, useful thermally activated curatives include amine, amide, imidazole, Lewis acid complex, and anhydride type materials. The curative may be of any type, but preferably is an amine type hardener that is selected from the group comprising dicyandiamide, imidazoles, polyamine salts and combinations thereof Acid-based curatives are less preferred. Amine-type hardeners are available from a variety of sources, e.g., OMICURE™, available from Omicron Chemical, AJICURE™, available from Ajinomoto Chemical, and Amicure™ CG 1200 available from Air Products.

In certain cases, it may be advantageous to add an accelerator to the sealant composition, so that it will fully cure at a lower temperature, or will fully cure when exposed to heat for shorter periods of time. Imidazoles are useful, suitable examples of which include 2,4-diamino-6-(2'-methyl-imidazoyl)-ethyl-s-triazine isocyanurate; 2-phenyl-4-benzyl-5-hydoxymethylimidazole; and Ni-imidazole-phthalate. CUREZOL 2-MZ azine, available from Air Products, is one example of a useful, commercially available material.

The activation temperature for the thermally-activated curative is selected so as to avoid premature curing of the epoxy-containing material under normal storage and handling temperatures for the sealant composition, as well as during the preparation and application of the sealant, which typically involve temperatures of up to about 105° C. On the other hand, if the activation temperature is too high, larger amounts of heat will be required to cure the sealant composition. Thus, it is preferred that the curative be selected so as to permit the sealant composition to fully cure in a time of about 15 to 60 minutes. (By "fully cure" it is meant that the sealant composition cures sufficiently for use in the intended application.) Curatives that have an activation temperature of about 140 to 180° C., more preferably about 160 to 170° C. are desired.

As described herein, there are particular advantages associated with a sealant composition that incorporates a thermoplastic polyurethane component based on a polyether polyol. In some instances, however, the performance of the sealant composition may be beneficially influenced by also including a thermoplastic polyurethane component based on a polyester polyol. For example, this thermoplastic polyurethane component may be selected to lower the viscosity or the melting temperature of the sealant composition (relative to sealant compositions that do not include this ingredient). This is especially the case if the thermoplastic polyurethane component based on the polyester polyol displays a higher glass. transition temperature than the polyether polyol based thermoplastic polyurethane component that is also included in the sealant composition. Thermoplastic polyurethane components based on polyester polyols preferably display a softening point of lower than 60° C., and more preferably lower than 50° C. (as measured according to ASTM D 816).

The amount of thermoplastic polyurethane component based on a polyester polyol comprises up to about 40 wt. % of the total thermoplastic polyurethane components in the sealant composition, more preferably up to about 30 wt. %.

Such thermoplastic polyurethane components are similar in composition to the thermoplastic polyurethane components previously described except that the polyether polyol is replaced by a polyester polyol. Polyester polyols useful in the practice of the invention are typically substantially linear compounds corresponding to the general structural formula HO—E—OH and having a hydroxyl functionality of about 2.2 or less, preferably about 2.0, wherein E represents the organic residue of a polyester linkage. Alternatively, the polyester polyol may be carboxyl terminated.

Polyester components useful for forming such thermoplastic polyurethane components comprise the reaction product of dicarboxylic acids (or, their diester equivalents, including anhydrides) and diols. The diacids (or diester equivalents) can be saturated aliphatic acids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic acids are succinic, glutaric, adipic, pimelic, suberic, azelaic, sebacic, 1,12-dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid,. 4,4'-benzophenone dicarboxylic acid, 4,4'-diphenylmethanedicarboxylic acid, 4,4'-diphenylthioether dicarboxylic acid, and 4,4'-diphenylamine dicarboxylic acid. Preferably the structure between the two carboxyl groups in the diacids contains only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-214-pentanediol, 1,6-hexanediol, cyclobutane-1,3-di(2'-ethanol), cyclohexane-1,4-dimethanol, 1,0-decanediol, 1,12-dodecanediol, and neopentyl glycol. Long chain diols including poly(oxyalkylene) glycols in which the alkylene group contains from 2 to 9 carbon atoms, preferably 2 to 4 carbon atoms, may also be used. Blends of the foregoing diols may be used.

Examples of useful, commercially available thermoplastic polyurethane components based on polyester polyol include DESMOCOLL 406 and DESMOCOLL 500 from Bayer Corporation.

It is also possible for the thermoplastic polyurethane component to include polymerized units derived from both polyether polyol and polyester polyol.

In other embodiments, the sealant compositions may include a hydroxyl- or carboxyl-terminated polyester compound in addition to the epoxy-containing material and the thermoplastic polyurethane component. Such polyester compounds can be useful for lowering the viscosity or the melting temperature of the sealant composition (relative to sealant compositions that do not include this ingredient). Preferred polyester compounds are semi-crystalline at room temperature (i.e., they display a crystalline melting point as determined by differential scanning calorimetry, preferably with a maximum melting point of about 200° C.). The preferred polyester compounds have a softening point of less than about 140° C., more preferably less than about 110° C. In addition, the preferred materials are solid at room temperature with a number average molecular weight of about 7500 to 200,000, more preferably about 10,000 to 50,000, and most preferably about 15,000 to 30,000. The polyester compound may be provided by the various polyester polyols discussed in conjunction with the polyester-based thermoplastic polyurethane components. These materials are typically employed in an amount of about 20 to 80 wt. % based on the weight of said thermoplastic polyurethane and can be beneficially employed in combination with thermoplastic polyurethane components that have a molding temperature in the range of about 140 to 200° C. Dynapol™ S1402 (softening point of 92° C.) from Hüls America, Inc., is one example of a useful, commercially available polyester compound.

Additionally, and optionally, up to 50% of the total volume of the composition, may be provided by various fillers, adjuvants, additives and the like such as silanes; chelating agents; processing aids; flame retardants; polymeric additives plasticizers; UV absorbents; surface active agents calcium carbonate, silica, glass; clay; talc; pigments, colorants; glass, ceramic or polymeric beads or bubbles; glass, polymeric or ceramic fibers; antioxidants; and the like so as to reduce the weight or cost of the composition, adjust viscosity, and provide additional reinforcement but without materially adversely affecting the performance of the sealant composition.

The individual ingredients for the sealant composition are combined in relative amounts that are determined by the nature of the ingredients and the properties desired in the ultimate sealant composition. For example, as the amount of epoxy-containing material increases the resulting sealant composition becomes less flexible and less tacky, the amount of flow that occurs upon heating the composition during the sealing process increases, and the propensity of the sealant to resist cracking and breaking when stressed under low temperature conditions is reduced. On the other hand, as the amount of epoxy-containing material decreases, the sealant composition may not flow adequately to wet-out the substrate surface surrounding the discontinuity and to seal the discontinuity.

Within these parameters, the sealant compositions of the invention may broadly incorporate about 20 to 70 weight percent (wt. %) epoxy-containing material, and 30 to 80 wt. % thermoplastic polyurethane component, based on these ingredients providing a combined amount of 100 wt. %. Preferably, however, the sealant compositions comprise about 20 to 40 wt. % epoxy-containing material, and 60 to 80 wt. % thermoplastic polyurethane component. More preferably, the sealant compositions comprise about 20 to 38 wt. % epoxy-containing material, and 62 to 80 wt. % thermoplastic polyurethane component. Even more preferably, the sealant compositions comprise about 25 to 35 wt. % epoxy-containing material, and 65 to 75 wt. % thermoplastic polyurethane component. Most preferably, the sealant compositions comprise about 30 to 33 wt. % epoxy-containing material, and 67 to 70 wt. % thermoplastic polyurethane component.

Any curative for the epoxy-containing material and any accelerator for the epoxy curing reaction are employed in an effective amount, that is, an amount sufficient to fully cure the epoxy-containing material in view of the time for and the temperature to which the sealant composition is heated to effect curing. The sealant is fully cured when it is cured sufficiently for use in the intended application, for example, it effectively seals a discontinuity in a motor vehicle from water, snow, dirt and other undesirable materials under the ordinary conditions of use. Within these guidelines, the curative is typically employed in an amount of about 1 to 15%, preferably about 2.5 to 4.5% based on the mass of the composition. An accelerator is typically employed in an amount of 0 to 2%, more preferably 0.2 to 0.7%. A typical curing cycle involves heating the sealant composition at a temperature of about 140 to 180° C. for about 15 to 60 minutes.

Sealant compositions according to the invention may be readily prepared. The various ingredients (except those that promote curing of the epoxy-containing material such as curatives and accelerators) are combined in a suitable mixing vessel, with the use of heat (typically to about 140 to 180° C.) and agitation as necessary. Thus, the mixing vessel may range from a metal container in which the ingredients are heated locally and mixed by hand, to a batch mixer, to a single or twin screw extruder having different mixing zones and in which the temperature within each zone may be independently controlled. These ingredients are thoroughly mixed and then cooled to a temperature below the activation temperature for any subsequently added thermally activated curative. The curative may be added at this time, along with any accelerator for the curing reaction, with thorough mixing.

The sealant composition may then be formed into any desired shape, depending upon the ultimate use for the sealant. For example, the sealant composition may be supplied in the form of a sealant film by coating or extruding the composition onto a single removable liner or between a pair of removable liners, cooling the applied material to ambient temperature, and then, if necessary, cutting the resulting sealant film to the desired shape. The composition may be coated with a heated knife coater or other coating apparatus or extruded through a die having the desired profile. The removable liners may be provided by any of those conventionally used in the preparation of adhesive or sealant films and often comprise a polymeric film (e.g., polyethylene terephthalate) that has been treated with a release agent such as a silicone or fluorosilicone polymer.

Although the sealant composition has been described as a single layer construction, two or more melt-flowable sealant layers having different melt flow properties may be laminated together to form the sealant composition. For example, the top layer can be formulated to have greater flow properties than the bottom layer, while the bottom layer is formulated to have higher strength for better handling properties. One layer may be formulated to be more tacky or to have higher strength in the uncured state than an adjacent layer.

Other layers may be combined with the sealant layer so as to form a sealant article. Such layers include a pressure-sensitive adhesive layer which may be thermosettable or not, a layer capable of cross-linking with the sealant layer at the interface between two adjacent layers, a woven or nonwoven web or scrim, a thermoplastic film, or a metal or plastic cap. The sealant article may include one or more of these layers.

The thermoplastic film is preferably dimensionally stable at temperatures to which the film might be exposed when applying the sealant composition to a substrate (e.g., when the sealant composition is heated to a temperature necessary to cause melt flow and/or curing), or after the sealant has been applied (e.g., exposure to cold weather temperatures, sunlight, etc.). By dimensionally stable, it is meant that the thermoplastic film has sufficient integrity at the temperatures of use and application, and particularly during heat curing of the sealant composition at about 140° C. to 180° C. for 15 to 60 minutes, that it does not melt and flow. Also the films do not wrinkle when they are heated to the melt sealing temperature and subsequently cooled. The films also have enough integrity to prevent entrapped air bubbles in the sealant layer from blowing through the film and causing a defect. The films can be used to provide smooth surfaces for painting or as the finished surface after the sealant article has been bonded to a surface. Films may be treated or primed to enhance paint adhesion. Preferred films include polyester films (e.g., polyethylene terephthalate) which may or may not be oriented, polyimide films, and polyolefin films (e.g., ultrahigh molecular weight polyethylene, microporous ultra-high molecular weight polyethylene, ultrahigh molecular weight polypropylene, and ultrahigh molecular weight microporous polypropylene).

Alternatively, the sealant layer may be combined with a metal or plastic cap that provides an exposed outer surface that imparts decorative and aesthetic features to the surface to which the sealant article is applied (e.g., the roof ditch of a motor vehicle). The shape of the cap is selected based upon the particular discontinuity that the article is designed to seal. Such a cap is preferably designed to substantially retain its shape during the melt-sealing operation. A preferred material for the cap is a B-staged thermosetting composition such as a B-staged epoxy-polyester blend. "B-staged" refers to an intermediate state in a thermosetting resin reaction in which the material softens when heated, and swells, but does not dissolve in certain liquids.

Figure 2:
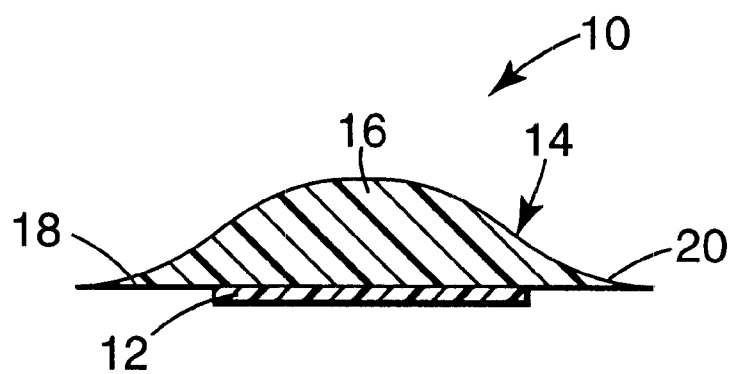
FIG. 2 is a cross-sectional view taken along lines 2—2 in FIG. 1.

A configuration that is particularly useful with seams or joints formed in the floor of recesses such as motor vehicle roof ditches is one in which the cross-sectional profile is characterized by a pair of laterally extending, opposed extensions, at least one of which is tapered in the thickness direction. Preferably, both of the opposed extension portions are tapered in the thickness direction. A representative construction is illustrated in FIGS. 1 and 2 in which a sealant article 10 comprises a sealant composition layer 12 and a plastic cap 14. The plastic cap includes a central body portion 16 and a pair of laterally extending, opposed extensions 18 and 20 that taper in the thickness direction and away from the central body portion. The length of sealant article 10 typically approximates the length of the discontinuity to be sealed.

The additional layers may be mated with the sealant composition in a variety of ways. If the sealant composition and any additional layers are provided in the form of separate strips or tapes, then they may be laminated together using, for example, commercially available nip rollers. If either or both of the additional layers and the sealant composition are tacky or pressure-sensitive, light pressure is sufficient to bond the different components together. Preferably, a temporary, removable release liner is applied to the tacky surface to protect it from contamination. In use, the tackiness of the sealant composition will provide sufficient adhesion to hold the components to a surface until the sealant article is cured and bonded permanently to the surface.

If neither the additional layers nor the sealant composition are tacky, then the components can be bonded together by heating one or both of the mating surfaces to a temperature at which at least one of the surfaces becomes tacky enough to form a bond by applying light pressure. Alternatively, a tie layer can be used to adhere the two components together. In use, a pressure-sensitive adhesive can optionally be applied to part or all of the lower or bottom surface of the sealant composition to hold the article in place on the substrate until the sealant composition is fully cured.

Selected subsequent layers and the sealant composition can also be mated by coextruding the different materials to form a unitary tape or strip.

Alternatively, the sealant composition can be placed as a discrete element on the surface to which a sealant article will be applied, and the subsequent layers attached at a later time. For example, the sealant composition can be applied as a tape, or it can be pumped onto the surface as a viscous liquid, paste or gel. Exposure to heat, e.g., from a paint bake oven cycle, will bond the subsequent layers to the sealant composition.

The above-described sealant compositions and articles are useful for sealing a variety of discontinuities such as overlap seams or joints, butt seams or joints, depressions or indentations, holes, spot welds, and manufacturing defects. They are particularly useful for sealing joints formed in the floors of motor vehicle roof ditches. The sealant composition or article is first positioned over the discontinuity that is to be sealed. Once the sealant has been secured over the discontinuity it is then heated to a temperature sufficiently high to cause the sealant composition to undergo mass flow, cure and seal the discontinuity, typically about 140 to 180° C. for 15 to 60 minutes. During the heating process, air in the region of the discontinuity is displaced by the melt flow of the sealant composition.

As noted elsewhere herein, the selection and amount of the sealant composition ingredients can influence the melt-flow characteristics of the sealant composition. It is desired that the sealant composition exhibit sufficient flow upon heating that the substrate surface surrounding the discontinuity is wetted and that the discontinuity is sealed, but without having the sealant flowing out of the area to be sealed (for example, flow out of the roof ditch in a motor vehicle). Within these guidelines, a flow distance of about 20 to 60 mm under the "Melt Flow" test described below is desirable. In addition, for enhanced commercial utility, it is desired that the melt flow of a sealant composition not decrease by more than 20%, even after extended (e.g., 3 months) storage under ambient temperature conditions. Following heating, the entire assembly is cooled, resulting in a structure in which the sealant composition seals the discontinuity.

The invention will now be further described by way of the following test methods and non-limiting examples.

TEST METHODS

Test Methods for Uncured Sealant Compositions
Melt Flow

A steel test coupon measuring 23 cm×5 cm and 2 mm thick and bearing a coating of the primer ED 5100 (commercially available from Advanced Coating Technology, Hillsdale, Mich., USA) was used as, received and prepared for the test by adhering a 12.5 mm wide strip of transfer tape (available as Tape 444 from 3M Company, St. Paul, Minn., USA) across the entire 5 cm width of the coupon and adjacent to one end of the coupon.

Then a 1 mm thick sample of uncured sealant composition measuring 14.5 mm×25.4 mm was placed orthogonally to the transfer tape with one end of the sealant composition sample overlapping the transfer tape. The sealant composition was applied by pressing onto the surface firmly by hand. The location of the end of the sealant composition that did not overlap the transfer tape was marked on the coupon. The coupon bearing the sealant composition was then placed at a 450 angle in a forced air oven at 177° C. for 20 min. The coupon edge bearing the transfer tape was at a higher elevation.

The coupon was then removed from the oven and allowed to cool to ambient temperature. The distance from the mark indicating the original edge of the sealant composition sample, to the edge of the sealant composition after melt flow had occurred was measured and recorded in mm. Two samples were evaluated simultaneously and the results averaged.

180° Peel Adhesion from Stainless Steel

A sealant composition sample having a thickness of 1 mm and dimensions of 2.54 cm wide by 20 cm long was rolled down two times on a stainless steel plate with a 6.8 kg rubber-coated rubber roller and allowed to stand 20 minutes before peel testing. Approximately 75 mm of the length of the sealant composition was bonded to the plate. Before applying the sealant composition sample, the stainless steel plate was wiped three times with methyl ethyl ketone and once with heptane. The peel adhesion was measured using a tensile testing apparatus (Model Z030 from Zwick GmbH, Ulm, Germany) at a peel speed of 300 mn/min. One end of the test plate was grasped in one jaw of the tensile tester. The sample of sealant composition was folded back at an angle of 180° and its free end grasped in the second jaw of the tensile tester in the configuration commonly utilized for 180° peel measurements. Three samples were measured and the results averaged. The results were measured in N/2.54 cm.

Test Methods for Cured Sealant Compositions
Low Temperature Flexibility

A 1 mm thick sample of uncured sealant composition (50 mm×125 mm) was adhered to a 0.385 mm thick stainless steel plate (50 mm×125 mm) by firm hand pressing and then rolling it down with a hand-held rubber-coated roller using hand pressure to remove air bubbles. The sample was then placed in a forced air oven at 160° C. for 20 min. The cured sample was then allowed to equilibrate overnight to ambient conditions.

The cured sample was placed in a freezer having a temperature of −30° C. for 16 hours. The sample was then removed from the freezer and quickly bent over a 13 mm diameter mandrel (available as Mandrel Tester Model 266 from Erichsen GmbH (Hemer-Sundwig, Germany)) which had also been cooled to −30° C. The back of the metal plate was placed on the mandrel and the sample was bent backwards until a metal to metal angle of 45° was obtained.

The samples were then evaluated visually for cracks and fractures in the cured sealant composition. If no cracks were visible to the eye, then the sample was rated as "pass". If cracks or fissures were present in the cured sealant composition in the area which had been bent, then the sample was rated as "fail".

Overlap Shear Strength from Abraded Aluminum

A 1 mm thick sample of a sealant composition in the form of a 20 mm diameter disc was placed between two rectangular aluminum plates measuring 2 mm×25 mm×75 mm that had been abraded with a SCOTCHBRITE Pad #7447 available from 3M Company, washed with water, rinsed with a 50%/50% by volume mixture of isopropyl alcohol and water, and then dried. Stainless steel spacers having a thickness of 0.8 mm were used to maintain the bond thickness during curing.

The construction was held together in a heated press with a pressure setting of 0.1–0.2 N/mm$^2$ and heated to 160° C. for 20 min. The samples were removed from the press and allowed to equilibrate at 23° C. and a relative humidity of 55% for 24 hours before testing.

One plate of the test construction was placed in the lower jaw of a tensile tester (Model Z030 from Zwick GmbH, Ulm, Germany) and the other plate was placed in the upper jaw. The jaws were then moved apart at a speed of 5 mm/min until bond failure occurred. The maximum force required to break the bond was recorded in N/mm$^2$ The test was performed three times and the results averaged.

Overlap Shear Strength from Unabraded Aluminum

This overlap shear test was performed as described above, with the exception that the aluminum plates were neither abraded nor cleaned before use. (However, the plate surfaces were wiped with a paper tissue before applying the sealant composition.)

Water Resistance

A 1 mm thick uncured sample of sealant composition having the dimensions of 50 mm×125 mm was placed on a steel test coupon (23 cm×5 cm) bearing a coating of the primer ED 5100 (commercially available from Advanced Coating Technology, Hillsdale, Mich., USA) and rolled down with hand pressure to remove air bubbles trapped in the bond line and cured at 160° C. for 20 minutes An X-shaped cut was made through the sealant composition to the steel test coupon by cutting along the imaginary lines running between opposing corners of the plate. The scored samples were placed in water (deionized with 0.2% liquid dishwashing soap available commercially as PRIL from Henkel) at a temperature of 70° C. for a period of three days. The samples were removed, rinsed and dried in air.

The cross-cut area where the two cuts intersected was examined. Samples where the sealant composition could be removed by hand from the plate starting at the cross-cut were rated as "fail" Samples where the sealant composition could not be removed by hand were rated as "pass".

Simulated Roof Ditch Test

A 300 mm long section of motor vehicle roof ditch was simulated by bending two cold-rolled steel panels having a thickness of 1 mm into a square u-shaped channel and spot welding them together in an overlapping configuration. The roof ditch had a width of 14.5 mm. The plates were overlapped in the bottom of the ditch to simulate a seam or a joint.

A section of uncured sealant composition having the dimensions of 1 mm×295 mm×14 mm was placed on top of the overlapping area of the steel plates in the bottom of the simulated roof ditch and pressed down by hand. The test sample was then placed in a forced air oven at 160° C. for 20 min.

The sample was then evaluated visually, especially in the area of the spot welds, for bubble formation and the desired tendency of the sealant composition to flow into indentations in the ditch caused by the spots welds. Adhesion to the roof ditch was evaluated by cutting the cured film with a razor blade.

Simulated Seam Sealing

A test substrate was prepared by attaching a 25 mm×150 mm×0.8 mm thick strip of SPCC-SD steel (=cold-rolled steel panel, optionally with dull surface finish) onto a 75 mm×150 mm×3 mm thick glass plate using a double-sided pressure-sensitive adhesive tape. The step from the steel down to the glass surface simulated a seam in the bottom of a roof ditch in a motor vehicle. A section of uncured sealant composition measuring 20 mm×100 mm was placed over one edge of the steel strip and heated for 10 minutes at 120° C. and then for 40 minutes at 140° C. After cooling to 23° C., the simulated seam (as represented by the step from the steel strip down to the surface of the glass plate) was examined visually through the glass to determine the quality of the seal that had formed. An acceptable seal was evidenced by the sealant composition having melted and flowed over the steel strip and filled the gap between the surface of the glass plate and the steel strip.

The following qualitative descriptions were used to assess the seal that had formed:

Good—an acceptable seal was formed along the entire 100 mm length of the sealant composition.

Fair—an acceptable seal was formed along the length of the sealant composition but with an unsealed air gap at one or both ends of the sealant composition.

Poor—unsealed air gaps were observed along the length of the sealant composition.

Temperature Cycle Aging Test

A 0.8 mm thick steel plate coated with an automotive grade electron deposition coating (E-coating U-600 Black from Nippon Paint Co., Ltd., Osaka, Japan) was bent into a square U-shaped channel measuring 25 mm long×8 mm wide×3 mm deep to simulate a motor vehicle roof ditch.

A section of uncured sealant composition measuring 25 mm×7 mm was placed in the bottom of the simulated roof ditch channel and heated at 120° C. for 10 minutes. After cooling to room temperature, a standard automotive paint primer (high molecular weight polyester based primer, crosslinked with melamine formaldehyde, obtained from Kansai Paint Co., Ltd., Osaka, Japan) was sprayed onto the sealant composition in a manner recommended by the manufacturer and then cured at 140° C. for 20 minutes. After cooling to room temperature, an automotive base paint (high molecular weight polyester based primer, crosslinked with melamine formaldehyde, obtained from Kansai Paint Co., Ltd., Osaka, Japan) was sprayed over the primer in a manner recommended by the manufacturer, cured at 140° C. for 20 minutes, and then cooled to room temperature. The painted sealant composition was then exposed to a temperature cycle aging test. One cycle consisted of 2 hours at −30° C., followed by 2 hours at room temperature (about 23° C.), and then 2 hours at 70° C. After 5 cycles, the condition of the sealant composition in the simulated roof ditch channel was examined visually using the following qualitative descriptions for the appearance.

Good—no difference in the visual appearance of the sealant composition before and after the test.

Poor—the visual appearance of the sealant composition was deteriorated after the test, as measured, for example, by the observation of a crack having formed between the edge of the sealant composition and the adjacent simulated roof ditch channel.

Cold Temperature Elongation

A section of uncured sealant composition was heated for 30 minutes at 140° C. and then cooled to room temperature. A test specimen of the cured sample was then die cut into a No. 1 dumbbell shape according to Japan Industrial Standard (JIS) K-6251. The test specimen was then marked to show two parallel lines 40 mm apart from each other, The test specimen was then clamped into the crosshead clamps (clamp distance is about 60–70 mm) of a Tensilon Tester (manufactured by Orientec Corporation) fitted with a controlled temperature conditioning chamber. The clamped specimen was conditioned for 20 minutes at −20° C. in the chamber and then stretched at a crosshead speed of 50 mn/min until the specimen broke. The elongation at break was calculated according to the following formula Elongation [%]=[(A−40)/40]×100 wherein A was the distance between the two parallel lines in mm when the specimen broke. It was also noted if the sealant composition appeared brittle.

250 Hour Water Soak

A sample was prepared by placing a strip of sealant composition measuring 25 mm×40 mm on a 65 mm×150 mm E-coated steel panel, and heating for 10 minutes at 120° C. After cooling to room temperature, an automotive paint primer was sprayed over the strip of sealant composition. The sample was cured for 20 minutes at 140° C. After cooling for at least 10 minutes, an automotive base paint was sprayed over the primer-coated sealant composition. The sample was cured for 20 minutes at 140° C., and then cooled to room temperature. The E-coated metal panels, the paint primer, and the base paint that were used were all as described in the Temperature Cycle Aging Test. The sample was soaked in water at 40° C. for 250 hours and then visually examined with the following qualitative descriptions of appearance:

Good—no different in the visual appearance of the sealant composition before and after the test.

Poor—the visual appearance of the sealant composition was deteriorated after the test as shown, for example, by wrinkles, blisters or bubbles that had formed in the paint because water had penetrated the sealant composition.

Lap Joint Sealing

Two 0.8 mm thick E-coated metal plates like those used in the Temperature Cycle Aging Test described above were welded together to form a lap joint. A strip of uncured sealant composition measuring 20 mm×100 mm was applied over the lap joint, heated for 10 minutes at 95° C., and then for 36 minutes at 140° C. After cooling, the sealant composition was examined visually to determine if the lap joint was sealed as indicated by the desired tendency of the sealant composition to flow into the lap joint and adhere to the metal plates. A qualitative evaluation of "Good" indicated that an acceptable seal was formed.

Surface Appearance

A simulated motor vehicle roof ditch was prepared by bending two E-coated metal plates (like those described previously in the Temperature Cycle Aging Test) into a square-U-shaped channel and spot welding them together in an overlapping configuration. The simulated roof ditch measured 20 mm wide, 10 mm deep, and 300 mm long with the welded seam or joint at the bottom of the ditch. Further, 10 recesses or indentations, each having a diameter of about 5 mm and a depth of about 0.8 mm, were formed in the bottom of the ditch. A strip of uncured sealant composition measuring 19 mm wide×300 mm long was placed in the bottom of the simulated roof ditch. The test specimen was then heated for 10 minutes at 100° C., followed by 20 minutes at 140° C., and then cooled for at least 10 minutes, and then heated again for 20 minutes at 140° C. The simulated roof ditch was then visually examined, especially in the area of the indentations, for the desired tendency of the sealant composition to fill the indentations and to form a smooth flat surface without depressions.

Other Test Methods

"Dynamic Mechanical Thermal Analysis (DMTA)"

A sealant composition was cured at 160° C. for 20 minutes. Circular samples of the cured sealant composition having a thickness of about 1 mm and a diameter of 7 mm were punched out and evaluated using a dynamic mechanical thermal analysis apparatus (Polymer Laboratories DMTA, Model MK II, available from Rheometrics Scientific, Piscataway, N.J., USA). Plots of storage modulus (G') versus temperature, loss modulus (G") versus temperature, and Tan δ (delta) (G"/G') versus temperature were measured between −100° C. and 200° C. using a heating rate of 2° C./min., a frequency of 1 Hz, and a strain of 1×16 microns.

DMTA can be used to measure the glass transition temperature of a thermoplastic polyurethane component and the glass transition temperature of a cured sealant composition. The glass transition temperature for the cured sealant composition is measured as the temperature at which the apex of the Tan δ peak attributable to the thermoplastic polyurethane component occurs, which peak should have an amplitude of at least 0.05 unit.

The presence of multiple Tan δ peaks in such an analysis indicates that the cured sealant composition has undergone the desired phase separation described herein. Sealant compositions 1, 3, 4, 6, 8–10, 14, 15 and 20–25 (described below) exhibited multiple Tan δ peaks indicative of phase separation.

EXAMPLES

In the examples, all amounts given in "parts" refer to parts by weight. The examples include various abbreviations and trade names, which may be interpreted according to the schedules shown below.

Schedules of Materials Used in the Examples

Thermoplastic Polyurethane Component

DESMOPAN KU2-8600 is a thermoplastic polyurethane (available from Bayer Corp., Polymers Division, Pittsburgh, Pa., USA) having an aromatic polyisocyanate/butanediol hard segment, and a polytetramethylene oxide soft segment (soft segment molecular weight of approximately 1160), a Tg of −20° C., a Shore D hardness of 31, and a Shore A hardness of 82.

TEXIN DP7-3005 is a thermoplastic polyurethane (available from Bayer Corp., Polymers Division, Pittsburgh, Pa., USA) having an aliphatic polyisocyanate/butanediol hard segment and a polytetramethylene oxide soft segment (soft segment molecular weight of approximately 1000), a Tg of −50 to 50° C. (plateau), a Shore D hardness of 43, and a Shore A hardness of 83.

TEXIN DP7-3006 is a thermoplastic polyurethane (available from Bayer Corp., Polymers Division, Pittsburgh, Pa., USA) having an aliphatic polyisocyanate/butanediol hard segment, a polytetramethylene oxide soft segment (soft segment molecular weight of approximately 650), and a Shore D hardness of 50.

TEXFN DP7-3007 is a thermoplastic polyurethane (available from Bayer Corp., Polymers Division, Pittsburgh, Pa., USA) having an aliphatic polyisocyanate/butanediol hard segment, a polyether soft segment, and a Shore D hardness of 58.

MORTHANE PE 192-100 is a thermoplastic polyurethane (available from Morton International Inc., Specialty Chemicals Division, Chicago, Ill., USA) having an aliphatic polyisocyanate hard segment, a polyether soft segment, and a Shore A hardness of 76.

MORTHANE PE 193-100 is a thermoplastic polyurethane (available from Morton International Inc., Specialty Chemicals Division, Chicago, Ill., USA) having an aliphatic polyisocyanate hard segment, a polyether soft segment, and a Shore A hardness of 74.

MORTHANE PE 299-100 is a thermoplastic polyurethane (available from Morton International Inc., Specialty Chemicals Division, Chicago, Ill., USA) having an aliphatic polyisocyanate hard segment, a polyether soft segment, and a Shore A hardness of 75.

PEARLTHANE 125 is a thermoplastic polyurethane (available from Mequinsa North America, Inc., Mohegan Lake, N.Y., USA) having an aromatic polyisocyanate hard segment and a polyester soft segment, a Shore A hardness of 85, and a Shore D hardness of 36.

PEARLTHANE 126 is a thermoplastic polyurethane (available from Mequinsa North America, Inc., Mohegan Lake, N.Y., USA) having an aromatic polyisocyanate hard segment and a polyester soft segment, a shore A hardness of 92, and a Shore D hardness of 42.

MORTHANE PN 03 214 is a thermoplastic polyurethane (available from Morton International Inc., Specialty Chemicals Division, Chicago, Ill., USA) having an aliphatic polyisocyanate hard segment, a polyester soft segment, and a Shore A hardness of 92.

DESMOCOLL 406 is a thermoplastic polyurethane (available from Bayer. Corp., Polymers Division, Pittsburgh, Pa., USA) having an aromatic polyisocyanate hard segment, a hydroxy polyester soft segment, a softening point of approximately 40° C., and a Shore A hardness of 97.

DESMOCOLL 500 is a thermoplastic polyurethane (available from Bayer. Corp., Polymers Division, Pittsburgh, Pa., USA) having an aromatic polyisocyanate hard segment, a hydroxy polyester soft segment, a softening point of approximately 50° C., and a Shore A hardness of 97.

ET370 is a thermoplastic polyurethane (available from Takeda Badische Urethane Industries, Ltd., Tokyo, Japan) with a polytetramethylene oxide soft segment, a hard segment derived from butanediol and a polyisocyanate, and having a Shore A hardness of 70, and a molding temperature around 160° C.

ET880 is a thermoplastic polyurethane (available from Takeda Badische Urethane Industries, Ltd., Tokyo, Japan) with a polytetramethylene oxide soft segment, a hard segment derived from butanediol and a polyisocyanate, and having a Shore A hardness of 80, and a molding temperature around 190° C.

Epoxy-Containing Material

DEN 431 is an epoxy-novolac resin, available from Dow Chemical Co., Midland, Mich., USA.

DEN 438 is an epoxy-novolac resin, available from Dow Chemical Co. Midland, Mich., USA.

EPIKOTE 828 is the diglycidyl ether of bisphenol A, available from Deutsche Shell Chemie GmbH, Eschborn, Germany.

EPONEX DRH 1510 is a cycloaliphatic hydrogenated diglycidyl ether of bisphenol A, available from Shell Nederland Chemie B.V., The Netherlands.

EPIKOTE, 1001 is a diglycidyl ether of bisphenol A (epoxy equivalent weight of 525–550 g/eq), available from Yuka Shell Epoxy K.K., Tokyo, Japan.

EPIKOTE 1004K is a solid diglycidyl ether of bisphenol A (epoxy equivalent weight of 875–975 g/eq), available from Yuka Shell Epoxy K.K., Tokyo, Japan.

EPIKOTE 828 is a diglycidyl ether of bisphenol A (epoxy equivalent weight of 185–192 g/eq) available from Yuka Shell Epoxy K.K., Tokyo, Japan.

Epoxy Resin I is a bisphenol A endcapped aliphatic epoxy resin, as described in Example 1 of U.S. Pat. No. 5,407,978 (Bymark et. al.).

Other Materials

A-187 refers to gamma-glycidyloxy-propyltrimethoxysilane, available from OSi Specialties of Danbury, Conn., USA.

H3636AS is a cyanoguanidine epoxy curing agent, available from Asahi Denka, Tokyo, Japan.

AEROSIL 200 is a hydrophilic fumed silica, available from Degussa Corp. of Ridgefield Park, N.J., USA.

AEROSIL R-972 is a hydrophobic fumed silica available from Degussa Corp. of Ridgefield Park, N.J., USA.

AMICURE CG1200 is dicyandiamide epoxy curing agent, available from Air Products and Chemicals, Inc., Allentown, Pa., USA.

CUREZOL 2-MZ is an imidazole derivative epoxy curing accelerator, available from Air Products and Chemicals, Inc., Allentown, Pa., USA.

DYNAPOL S 1402 is a hydroxyl functional, semi-crystalline polyester resin available from Hüls America (subsidiary of Hüls AG, Marl, Germany), with a melting point of 92° C., a glass transition temperature of −12° C., and a melt flow rate at 160° C. of 120 g/10 minutes.

KRATON L1203 is an ethylene/butylene copolymer containing a single terminal aliphatic primary hydroxy group on one end, available from Shell Chemical Co. of Houston, Tex., USA.

KRATON L2203 is an ethylene/butylene copolymer containing a terminal aliphatic primary hydroxy group on each end, available from Shell Chemical Co. of Houston, Tex., USA.

2MZA is an imidazole derivate epoxy curing agent, available from Shikoku Kasei Co. Ltd., Tokyo, Japan.

PET refers to polyethylene terephthalate.

TFA refers to 4,4,4-trifluoro-1-(2-thienyl)-1,3-butanedione, available from Fluka Chemie AG, Buchs, Switzerland.

Sealant Compositions 1 to 30

Sealant compositions 1 to 30 were prepared according to the following procedure

The thermoplastic aliphatic or aromatic, respectively, polyurethane component was combined with an epoxy-containing material, along with any additional components (other than curative or accelerator) in u metal can. The mixture was, heated to 150° C. in case of an aliphatic polyurethane component or 175° C. in case of an aromatic polyurethane component, respectively, with intermittent hand-mixing for about three hours in case of an aliphatic polyurethane component or for about four hours in case of an aromatic polyurethane component, respectively. The mixture was then allowed to cool to about 105° C. in case of an aliphatic polyurethane component or 150° C. in case of an aromatic polyurethane component, respectively, and then AMICURE CG 1200 curative and CUREZOL 2-MZ accelerator were added and thoroughly mixed.

The mixture, having a temperature of about 100° C., was coated while hot between two 50 micron thick two silicone coated PET release liners using a heated knife coater with a gap set to provide a 1 mm thick coating. The coating was allowed to cool to 23° C. under ambient conditions.

The specific composition of each sealant is summarized in Table 1. The resulting film of sealant composition was cut to size and evaluated using the test methods described above with the result summarized in the various following tables.

TABLE 1

| Sealant Composition | Thermoplastic Polyurethane Component (parts) | Epoxy-Containing Material (parts) | Parts Dicyandi-amide (parts) | Parts Curezol 2-MZ Azine (parts) | Silica (parts) | Polymeric Additive (parts) | Other Materials (parts) |
|---|---|---|---|---|---|---|---|
| 1 | TEXIN DP7-3005 (67.80) | EPIKOTE 828 (29.06) | 2.72 | 0.42 | — | — | — |
| 2 | TEXIN DP7-3005 (47.43) | EPIKOTE 828 (47.43) | 4.44 | 0.69 | — | — | — |
| 3 | TEXIN DP7-3005 (78.31) | EPIKOTE 828 (19.58) | 1.83 | 0.28 | — | — | — |
| 4 | DESMOPAN KU2-8600 (67.80) | EPIKOTE 828 (29.06) | 2.72 | 0.42 | — | — | — |
| 5 | DESMOPAN KU2-8600 (47.43) | EPIKOTE 828 (47.43) | 4.44 | 0.69 | — | — | — |
| 6 | TEXIN DP7-3006 (64.58) | EPIKOTE 828 (31.66) | 2.67 | 0.41 | — | — | — |
| 7 | TEXIN DP7-3007 (67.80) | EPIKOTE 828 (29.06) | 2.72 | 0.42 | — | — | — |
| 8 | MORTHANE PE 192-100 (67.80) | EPIKOTE 828 (29.06) | 2.72 | 0.42 | — | — | — |
| 9 | MORTHANE PE 193-100 (67.80) | EPIKOTE 828 (29.06) | 2.72 | 0.42 | — | — | — |
| 10 | MORTHANE PE 299-100 (67.80) | EPIKOTE 828 (29.06) | 2.72 | 0.42 | — | — | — |
| 11 | PEARLTHANE 125 (67.80) | EPIKOTE 828 (29.06) | 2.72 | 0.42 | — | — | — |
| 12 | PEARLTHANE 126 (67.80) | EPIKOTE 828 (29.06) | 2.72 | 0.42 | — | — | — |
| 13 | MORTHANE PN 03 214 (67.80) | EPIKOTE 828 (29.06) | 2.72 | 0.42 | — | — | — |
| 14 | DESMOPAN KU2-8600 (67.80) | EPONEX DRH 1510 (29.06) | 2.72 | 042 | — | — | — |
| 15 | DESMOPAN KU2-8600 (67.80) | DEN 431 (29.06) | 2.72 | 0.42 | — | — | — |
| 16 | DESMOPAN KU2-8600 (67.80) | DEN 438 (29.06) | 2.72 | 0.42 | — | — | — |
| 17 | TEXIN DP7-3005 (67.80) | EPONEX DRH 1510 (29.06) | 2.72 | 0.42 | — | — | — |
| 18 | TEXIN DP7-3005 (67.80) | DEN 431 (29.06) | 2.72 | 0.42 | — | — | — |
| 19 | TEXIN DP7-3005 (67.80) | DEN 438 (29.06) | 2.72 | 0.42 | — | — | — |
| 20 | TEXIN DP7-3005 (61.54) | EPIKOTE 828 (33.14) | 4.20 | 0.64 | AEROSIL 200 (0.47) | — | — |
| 21 | TEXIN DP7-3005 (61.25) | EPIKOTE 828 (32.98) | 4.18 | 0.64 | AEROSIL 200 (0.94) | — | — |
| 22 | TEXIN DP7-3005 (60.68) | EPIKOTE 828 (32.67) | 4.14 | 0.63 | AEROSIL 200 (1.87) | — | — |
| 23 | DESMOPAN DU2-8600 (61.25) | EPIKOTE 828 (32.98) | 4.18 | 0.64 | AEROSIL R-972 (0.94) | — | — |
| 24 | TEXIN DP7-3006 (60.00) | EPIKOTE 828 (30.00) | 4.00 | 0.60 | — | KRATON L1203 (5.40) | — |
| 25 | TEXIN DP7-3006 (61.10) | EPIKOTE 828 (30.54) | 4.07 | 0.62 | — | KRATON L2203 (3.67) | — |

TABLE 1-continued

| Sealant Composition | Thermoplastic Polyurethane Component (parts) | Epoxy-Containing Material (parts) | Parts Dicyandiamide (parts) | Parts Curezol 2-MZ Azine (parts) | Silica (parts) | Polymeric Additive (parts) | Other Materials (parts) |
|---|---|---|---|---|---|---|---|
| 26 | TEXIN DP7-3006 (60.27) | EPIKOTE 828 (30.13) | 4.01 | 0.61 | AEROSIL R-972 (1.36) | KRATON L2203 (3.62) | — |
| 27 | TEXIN DP7-3006 (58.17) | EPIKOTE 828 (29.08) | 3.87 | 0.59 | AEROSIL 200 (1.31) | KRATON L1203 (6.98) | — |
| 28 | DESMOPAN KU2-8600 (59.03) | EPIKOTE 828 (31.78) | 4.03 | 0.62 | — | — | A-187 (0.91), TFA (3.63) |
| 29 | TEXIN DP7-3005 (59.03) | EPIKOTE 828 (31.78) | 4.03 | 0.62 | — | — | A-187 (0.91), TFA (3.63) |
| 30 | TEXIN DP7-3006 (62.24) | EPIKOTE 828 (31.11) | 4.14 | 0.63 | — | — | Glycerine (1.87) |

— Means that this material was not present

Sealant Compositions 31 to 34

Sealant compositions 31 to 34 were prepared in the same manner as described in conjunction with sealant compositions 1 to 30 except using mixtures of two different thermoplastic polyurethane components as shown below in Table 2.

TABLE 2

| Sealant Composition | Thermoplastic Polyurethane Component 1 (parts) | Thermoplastic Polyurethane Component 2 (parts) | Epoxy-Containing Material (parts) | Curative (parts) | Accelerator (parts) |
|---|---|---|---|---|---|
| 31 | DESMOPAN KU2-8600 (33.30) | DESMOCOLL 406 (33.30) | EPIKOTE 828 (28.53) | 4.22 | 0.65 |
| 32 | DESMOPAN KU2-8600 (49.94) | DESMOCOLL 406 (16.65) | EPIKOTE 828 (28.53) | 4.22 | 0.65 |
| 33 | DESMOPAN KU2-8600 (33.30) | DESMOCOLL 500 (33.30) | EPIKOTE 828 (28.53) | 4.22 | 0.65 |
| 34 | DESMOPAN KU2-8600 (49.94) | DESMOCOLL 500 (16.65) | EPIKOTE 828 (28.53) | 4.22 | 0.65 |

Example 1

Example 1 shows the effect on the Melt Flow and Low Temperature (Temp.) Flexibility Tests by varying the type of epoxy-containing material. The types and amounts of all other components remained constant. The thermoplastic polyurethane used in these formulations is one preferred material, TEXIN DP7-3005. The results are shown in Table 3.

TABLE 3

| Sealant Composition | Epoxy-Containing Material | Uncured Sealant Composition Melt Flow (mm) | Cured Sealant Composition Low Temp. Flexibility |
|---|---|---|---|
| 1 | EPIKOTE 828 | 35* | Pass |
| 17 | EPONEX DRH 1510 | 81 | Pass |
| 18 | DEN 431 | 36 | Pass |
| 19 | DEN 438 | 5 | Pass |

*Tested at 150° C. All other sealant compositions tested at 177° C.

In addition, sealant composition 1, while uncured, had an 180° peel adhesion of 1.65 N/2.54 cm. Once cured, sealant composition 1 displayed an overlap shear strength of 4.9 N/mm$^2$ to abraded aluminum and 8.1 N/mm$^2$ to unabraded aluminum. It also gave an acceptable appearance in the Simulated Roof Ditch Test. These tests were carried out as described above.

Example 2

This example shows the effect on the melt flow (measured as described above) of the uncured sealant composition by varying the type of epoxy-containing material. The results are illustrated in Table 4. The types and amounts of the other components remained constant. The thermoplastic polyurethane component used in these formulations was another preferred material, DESMOPAN KU2-8600. Each of the sealant compositions, when cured, passed the Low.Temperature Flexibility Test described above.

TABLE 4

| Sealant Composition | Epoxy-Containing Material | Uncured Sealant Composition Melt Flow (mm)* |
|---|---|---|
| 4 | EPIKOTE 828 | 35 |
| 14 | EPONEX DRH 1510 | 52 |
| 15 | DEN 431 | 16 |
| 16 | DEN 438 | 0 |

*Tested at 177° C.

Example 3

This example shows the effect on melt flow and 180° peel adhesion for the uncured sealant composition, and on the low temperature (temp.) flexibility of the cured sealant composition by varying the weight ratio of thermoplastic polyurethane component to epoxy-containing material (referred to as "Ratio" in Table 5). The results are presented in Table 5. At high levels of epoxy-containing material, the cured sealant composition was brittle and failed the Low Temperature Flexibility Test. The test procedures were carried out as described above.

TABLE 5

| Sealant Composition | Ratio | Uncured Sealant Composition Melt Flow (mm) | 180° Peel Adhesion (N/2.54 cm) | Cured Sealant Composition Low Temp. Flexibility |
|---|---|---|---|---|
| 3 | 2.42 | 17* | 2.27 | Pass |
| 1 | 2.33 | 35* | 1.65 | Pass |
| 2 | 1.00 | 75* | 0.61 | Fail |
| 4 | 2.33 | 35 | — | Pass |
| 5 | 1.00 | 45 | — | Fail |

*Tested at 150° C. All other sealants were tested at 177° C.
— means not measured

Example 4

This example shows the influence of the hardness of the thermoplastic polyurethane component and of the type of soft segment used therein (polyether or polyester) on the low temperature (temp.) flexibility properties of the cured sealant compositions. The test was performed as described above and with the results given in Table 6.

TABLE 6

| Sealant Composition | Thermoplastic Polyurethane Type | Thermoplastic Polyurethane Hardness | Low Temp. Flexibility |
|---|---|---|---|
| 4 | Polyether | Shore D = 31 Shore A = 82 | Pass |
| 1 | Polyether | Shore D = 43 Shore A = 83 | Pass |
| 7 | Polyether | Shore D = 58 | Fail |
| 8 | Polyether | Shore A = 76 | Pass |
| 9 | Polyether | Shore A = 74 | Pass |
| 10 | Polyether | Shore A = 75 | Pass |
| 11 | Polyester | Shore D = 36 | Fail |
| 12 | Polyester | Shore D = 42 | Fail |

Example 5

This example demonstrates the effect of adding silica to the sealant compositions of the invention and then testing according to the previously described methods. The results are presented in Table 7.

TABLE 7

| Sealant Composition | % Silica | Uncured Sealant Composition Melt Flow (mm)* | Cured Sealant Composition Low Temp. Flexibility | Cured Sealant Composition Water Resistance |
|---|---|---|---|---|
| 20 | 0.47 | 31 | Pass | Pass |
| 21 | 0.94 | 18 | Pass | Pass |
| 22 | 1.87 | 1 | Pass | Pass |

*Tested at 177° C.

Example 6

This example shows the effect of using 4,4,4,-trifluoro-1s(2-thienyl)-1,3-butanedione chelating agent as described in Table 8 and according to the test procedures described above.

TABLE 8

| Sealant Composition | Uncured Sealant Composition Melt Flow (mm)* | Cured Sealant Composition Water Resistance |
|---|---|---|
| 28 | 43 | Pass |
| 29 | 53 | Pass |

*Tested at 177° C.

Example 7

This example and the results illustrated in Table 9 show that a thermoplastic polyurethane component derived from a polyether polyol and having a relatively low softening temperature can be effectively blended with a thermoplastic polyurethane component derived from a polyester polyol and having a relatively high softening temperature to achieve sealant compositions according to the invention. The tests were conducted according to the procedures described above.

TABLE 9

| Sealant Composition | Uncured Sealant Composition Melt Flow (mm)* | Cured Sealant Composition Low Temp. Flexibility |
|---|---|---|
| 31 | 57 | Fail |
| 32 | 41 | Pass |
| 33 | 79 | Fail |
| 34 | 59 | Pass |

*Tested at 177° C.

Example 8

This example shows the relationship between phase separation that occurs in cured sealant compositions according to the invention and low temperature flexibility properties. Sealant compositions 11 and 12 (which included a thermoplastic polyurethane derived from a polyester polyol) did not phase separate upon curing, while sealant compositions 1 and 4, which are typical of all of the samples that passed the Low Temperature Flexibility Test, did phase separate upon curing. Other test results are given in Table 10. All tests were conducted according to the previously described procedures.

TABLE 10

| Sealant Composition | Phase Separation Upon Curing | Cured Sealant Composition Low Temp. Flexibility |
|---|---|---|
| 1 | Yes | Pass |
| 4 | Yes | Pass |
| 11 | No | Fail |
| 12 | No | Fail |

Example 9

This example and Table 11 show the results of testing (as described above) of other sealant compositions.

TABLE 11

| | | Cured Sealant Composition | |
|---|---|---|---|
| Sealant Composition | Uncured Sealant Composition Melt Flow (mm)* | Low Temp. Flexibility | Simulated Roof Ditch (appearance) |
| 6 | 43 | Fail | OK |
| 13 | — | Fail | — |
| 17 | 81 | Pass | — |
| 18 | 36 | Pass | — |
| 19 | 5 | Pass | — |
| 23 | 9 | Pass | — |
| 24 | 34 | Fail | OK |
| 25 | 40 | Fail | OK |
| 26 | 27 | Fail | OK |
| 27 | 25 | Fail | OK |
| 30 | 37 | Fail | — |

*Tested at 177° C.
— Not tested

Examples 6 and 24–27 and 30 were based on a sealant composition that incorporated a thermoplastic polyurethane component that had a Shore D hardness equal to 50, and which demonstrated a Tan δ peak (DMTA analysis) having an amplitude of less than 0.05 unit in the low temperature range between −50 to 0° C.

Sealant compositions 24, 25 and 30 passed the water resistance test. The other sealant compositions in this table were not evaluated under this test.

Example 10

A sealant composition was prepared by compounding a blend comprising 40 parts of a thermoplastic polyurethane component (ET370), 10 parts of a polyester compound (DYNAPOL S 1402), and 40 parts of an epoxy-containing material (EPIKOTE 1001F) at a temperature setting of 160° C., extruding the blend into strands, and pelletizing the strands using a 15 mm twin screw continuous compounding single zone extruder (MP-2015 Bench extruder manufactured by APV Chemical Machinery, Inc., U.S.A. After cooling, 90 parts of the pellets were extruded with 10 parts of an epoxy curative mixture having 2 parts of dicyandiamide (available from ACR Co. Ltd., Tokyo, Japan) and 1 part 2MZA using the same extruder at a temperature setting of 110° C. The extrudate was immediately knife coated between two silicone-coated PET release liners to form a sheet of sealant composition having a thickness of 2.0 mm. The sheet was then cooled to room temperature (about 23° C.). The resulting sheet was cut into appropriate sized sections and tested following the procedures described above, with the results shown below in Table 12.

Example 11

A sealant composition was prepared and tested according to the method described in Example 10 except that the sealant composition included 50 parts of ET370, 40 parts of EPIKOTE 1001F, and 10 parts of the epoxy curative mixture. Test results are shown in Table 12.

Example 12

A sealant composition was prepared and tested according to the method described Example 10 except that the thermoplastic polyurethane component was provided by ET880. Test results are shown in Table 12.

TABLE 12

| | Test Procedure | | | |
|---|---|---|---|---|
| Example | Simulated Seam Sealing | Temperature Cycle Aging | Cold Temperature Elongation | 250 Hour Water Soak |
| 10 | Good | Good | 70% | Good |
| 11 | Fair | Good | 70% (brittle) | Good |
| 12 | Poor | Good | 25% (brittle) | Good |

Example 13

A first sealant composition was prepared according to the procedure described in Example 10, except that the extruder was set at a temperature of 100° C. and the blend comprised 60 parts of a polyester component (DYNAPOL S1402), 30 parts of an epoxy-containing material (Epoxy Resin I), and 10 parts of an epoxy curative mixture. The epoxy curative mixture contained 70 parts of H3636AS and 30 parts of 2MZA. The extruded composition was immediately knife coated to a thickness of 1.5 mm between two silicone coated PET release liners to form the first layer of a multilayer sealing tape.

Pellets of a second sealant composition were prepared according to the procedure described in Example 10 except that the blend comprised 40 parts of thermoplastic polyurethane component (ET370), 50 parts of an epoxy-containing material, and 3.5 parts of calcium carbonate. The epoxy-containing material was a mixture of 20 parts of EPIKOTE 1004K and 30 parts of EPIKOTE 828. After cooling, 93.5 parts of these pellets were extruded with 6.5 parts of an epoxy. curative mixture having 10 parts of H3636AS and 3 parts of 2MZA. The second sealant composition was immediately knife coated to a thickness of 2.0 mm between two silicone coated PET release liners to form the second layer of a multilayer sealing tape.

A 3.7 mm thick multilayer sealing tape was prepared by laminating a 0.44 mm thick polyester non-woven fabric with a basis weight of 100g/m$^2$ (MARIX21008WTV available from Yunichika, Osaka, Japan) between the first and second layers of sealant composition, taking care to prevent air entrapment during the lamination.

A 150 micrometer thick, double-side surface treated PET film (available as OPF film from Teijin, Osaka, Japan) was then laminated to the exposed surface of the second layer of sealant composition to provide a paintable surface. The multilayer sealing tape was tested according to the Lap Joint Sealing and Sealant Composition Surface Appearance Tests described above and with the results shown below in Table 13.

Example 14

A 3.8 mm thick multilayer sealing tape was prepared and tested according to the procedures and sealant compositions described for Example 13, except that the nonwoven fabric layer was provided by a 0.50 mm thick polyester nonwoven material having a basis weight of 100 g/m$^2$ (Smash available from Asahi Kasei, Osaka, Japan).

Example 15

A 3.5 mm thick multilayer sealing tape was prepared by laminating three 1.0 mm thick layers of sealant composition (prepared according to the procedures and composition for the second sealant composition described in Example 13) with a layer of a polyester nonwoven fabric (MARIX21008WTV) between each layer of sealant composition. The multilayer sealing tape had the following construction: sealant composition/nonwoven fabric/sealant composition/nonwoven fabric/sealant composition.

The PET film described in Example 13 was then laminated to one side of the multilayer sealant tape.

TABLE 13

| | Uncured Sealant Composition Test Methods | |
|---|---|---|
| Example | Lap Joint Sealing | Surface Appearance |
| 13 | Good | Flat, no depressions over indentations |
| 14 | Good | Flat, no depressions over indentations |
| 15 | Good | Flat, no depressions over indentations |

Various modifications of the foregoing description will be apparent to those skilled in the art without departing from the invention, which is defined by the appended claims:

What is claimed is:

1. A sealant article comprising:
   a) a layer of a sealant composition comprising:
      i) a curable epoxy-containing material;
      ii) a first thermoplastic polyurethane component that is the polymerization product of a polymerizable mixture comprising a polyisocyanate and a polytetramethylene oxide polyol;
      iii) a curative for-the epoxy-containing material; and
      iv) optionally, a second thermoplastic polyurethane component that is different than the first thermoplastic polyurethane component;

wherein the composition provides a melt-flowable sealant for sealing discontinuities in the surface of a substrate; and
   b) another layer attached to the sealant composition layer of part a) which other layer is selected from the group consisting of: woven webs, non-woven webs, scrims, and metal caps.

2. A composition comprising:
   a) a curable epoxy-containing material;
   b) a first thermoplastic polyurethane component;
   c) a curative for the epoxy-containing material; and
   d) a second thermoplastic polyurethane component that is different than the first thermoplastic polyurethane component;
   wherein components (a), (b) and (d) display only a single-phase upon melt blending, but the composition is phase-separated after curing;
   said composition being characterized by both polyether and polyester thermoplastic polyurethanes being used in which the weight ratio of polyether polyurethane to polyester lethane is greater than 1.

3. The sealant article according to claim 1 wherein the sealant composition is tacky at a temperature of about 15 to 25° C.

4. The sealant article according to claim 1 wherein the sealant composition has at least one glass transition temperature of less than −20° C.

5. The sealant article according to claim 1 wherein the first thermoplastic polyurethane component has a Shore D hardness of less than 50 or a Shore A hardness of less than 85.

6. The sealant article according to claim 1 wherein the sealant composition comprises:
   i) about 20 to 40 weight percent of the epoxy-containing material; and
   ii) about 60 to 80 weight percent of all thermoplastic polyurethane components present in the composition;
   wherein the sum of (i) and (ii) is 100 weight percent.

7. A composition according to claim 2 wherein the first thermoplastic polyurethane component is the polymerization product of a polymerizable mixture comprising a polyisocyanate and polyether polyol.

8. The sealant article according to claim 1 wherein the polytetramethylene oxide polyol for the first thermoplastic polyurethane component has a number average molecular weight of at least 600.

9. The sealant article according to claim 8 wherein the polyisocyanate for the first thermoplastic polyurethane component is an aliphatic diisocyanate.

10. The sealant article according to claim 1 wherein the polytetramethylene oxide polyol for the first thermoplastic polyurethane component has a number average molecular weight of at least 1000.

11. The sealant article according to claim 10 wherein the polyisocyanate for the first thermoplastic polyurethane component is an aromatic diisocyanate.

12. An article comprising a surface having a discontinuity formed thereon, and a layer of a sealant article comprising:
   a) a layer of a sealant composition comprising:
      i) a curable epoxy-containing material;
      ii) a first thermoplastic polyurethane component that is the polymerization product of a polymerizable mixture comprising a polyisocyanate and a polytetramethylene oxide polyol;
      iii) a curative for the epoxy-containing material; and
      iv) optionally, a second thermoplastic polyurethane component that is different than the first thermoplastic polyurethane component;

wherein the composition provides a melt-flowable sealant for sealing discontinuities in the surface of a substrate; and b) another layer attached to the sealant composition layer of part a) which other layer is selected from the group consisting of: woven webs, non-woven webs, scrims, thermoplastic film, metal caps and plastic caps, the sealant composition of which has been cured and which seals the discontinuity.

13. The article according to claim 12 wherein the polymerizable mixture for the first thermoplastic polyurethane component comprises:

a) an aliphatic diisocyanate, a polytetramethylene oxide polyol that has a number average molecular weight of at least 600, and a diol chain extending agent; or b) an aromatic diisocyanate, a polytetramethylene oxide polyol that has a number average molecular weight of at least 1000, and an diol chain extending agent.

14. The sealant article according to claim 13 wherein the curative for the epoxy-containing material is dicyandiamide.

15. The sealant article according to claim 14 wherein the sealant composition further comprises an imidazole accelerator.

16. A method of sealing a discontinuity in the surface of a substrate, the method comprising the steps of:

a) placing over the discontinuity, a sealant composition comprising
   i) a curable epoxy-containing material;
   ii) a first thermoplastic polyurethane component that is the polymerization product of a polymerizable mixture comprising a polyisocyanate and a polytetramethylene oxide polyol;
   iii) a curative for the epoxy-containing material; and
   iv) optionally, a second thermoplastic polyurethane component different from the first thermoplastic polyurethane component;

b) heating the sealant composition to cause the composition to flow and seal the discontinuity; and allowing the sealant composition to cool.

17. A method according to claim 16 further comprising the step of heating the sealant composition for a time and at a temperature sufficient to fully cure the sealant composition.

* * * * *

UNITED STATES PATENT AND TRADEMARK OFFICE
CERTIFICATE OF CORRECTION

PATENT NO. : 6,582,824 B1
DATED : June 24, 2003
INVENTOR(S) : Weigl, Stefan

It is certified that error appears in the above-identified patent and that said Letters Patent is hereby corrected as shown below:

Column 3,
Line 2, delete "40ºC" and insert in place thereof -- -40ºC --.

Column 4,
Line 5, delete "da" and insert in place thereof -- in a --.

Column 6,
Line 34, delete "40ºC" and insert in place thereof -- -40ºC --.

Column 7,
Line 60, insert -- . -- following "thereof".

Column 8,
Line 8, delete "acid," and insert in place thereof -- acid; --.
Line 19, delete "dihydrazide;," and insert in place thereof -- dihydrazide; --.
Line 19, delete "m-xylylene" and insert in place thereof -- m-xylene --.
Line 52, insert -- . -- following "thereof"

Column 9,
Line 27, delete "glass." and insert in place thereof -- glass --.

Column 15,
Line 50, insert -- . -- following "minutes".
Line 61, insert -- . -- following "fail".

Column 19,
Line 9, delete "TEXFN" and insert in place thereof -- TEXIN --.

Column 21,
Line 8, delete "in u" and insert in place thereof -- in a --.

UNITED STATES PATENT AND TRADEMARK OFFICE
CERTIFICATE OF CORRECTION

PATENT NO. : 6,582,824 B1
DATED : June 24, 2003
INVENTOR(S) : Weigl, Stefan

It is certified that error appears in the above-identified patent and that said Letters Patent is hereby corrected as shown below:

Column 29,
Line 2, delete "." following "epoxy".

Signed and Sealed this

Twentieth Day of April, 2004

JON W. DUDAS
*Acting Director of the United States Patent and Trademark Office*